(12) United States Patent
Minami et al.

(10) Patent No.: US 9,046,234 B2
(45) Date of Patent: Jun. 2, 2015

(54) SIMULATED SOLAR IRRADIATION DEVICE AND SPECTRAL ADJUSTMENT METHOD THEREOF

(75) Inventors: Kohji Minami, Osaka (JP); Masaru Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 20 days.

(21) Appl. No.: 14/232,712

(22) PCT Filed: Apr. 2, 2012

(86) PCT No.: PCT/JP2012/058796
§ 371 (c)(1),
(2), (4) Date: Jan. 14, 2014

(87) PCT Pub. No.: WO2013/011718
PCT Pub. Date: Jan. 24, 2013

(65) Prior Publication Data
US 2014/0140035 A1    May 22, 2014

(30) Foreign Application Priority Data

Jul. 20, 2011   (JP) ................................ 2011-159265

(51) Int. Cl.
| | |
|---|---|
| *F21V 9/02* | (2006.01) |
| *F21S 8/00* | (2006.01) |
| *F21V 8/00* | (2006.01) |
| *G01R 31/40* | (2014.01) |

(52) U.S. Cl.
CPC ............... *F21S 8/006* (2013.01); *G02B 6/0026* (2013.01); *G02B 6/0028* (2013.01); *G02B 6/0068* (2013.01); *G02B 6/007* (2013.01); *H02S 50/00* (2013.01)

(58) Field of Classification Search
CPC ..... F21S 8/006; G02B 6/0026; G02B 6/0028; G02B 6/0068; G02B 6/007
USPC .......................................... 362/1–2, 608, 610
See application file for complete search history.

(56) References Cited

U.S. PATENT DOCUMENTS

2012/0014085 A1   1/2012  Minami
2012/0287600 A1   11/2012 Iden et al.

FOREIGN PATENT DOCUMENTS

| JP | 2001-237087 A | 8/2001 |
| JP | 2011-222655 A | 11/2001 |
| JP | 2005-51014 A | 2/2005 |
| JP | 2007-165376 A | 6/2007 |
| JP | 4668348 B1 | 4/2011 |
| WO | 2010/143329 A1 | 12/2010 |
| WO | 2012/014767 A1 | 2/2012 |

OTHER PUBLICATIONS

Official Communication issued in International Patent Application No. PCT/JP2012/058796, mailed on Jul. 3, 2012.

*Primary Examiner* — Jason Moon Han
(74) *Attorney, Agent, or Firm* — Keating & Bennett, LLP

(57) ABSTRACT

In a simulated sunlight irradiation apparatus (100), at least one of at least one optical filter (4) and at least one optical filter (6) is provided so as to be switchable with another optical filter (14 or 16) having a transmittance characteristic that is different from a transmittance characteristic of the at least one of the at least one optical filter (4) and the at least one optical filter (6).

5 Claims, 9 Drawing Sheets

F I G. 1
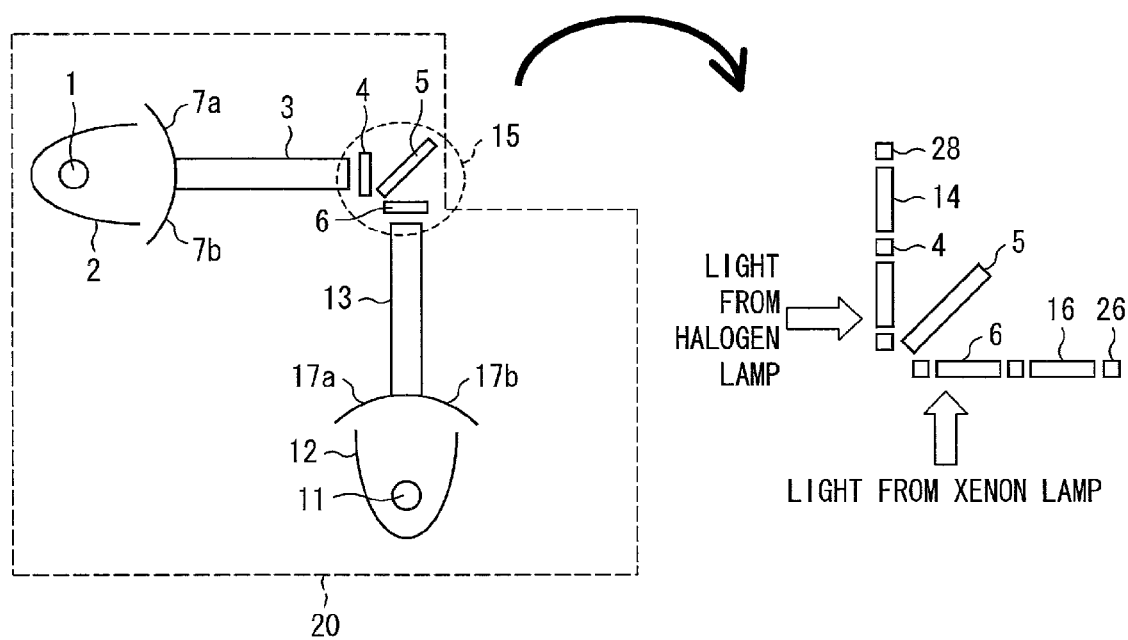

F I G. 1 5
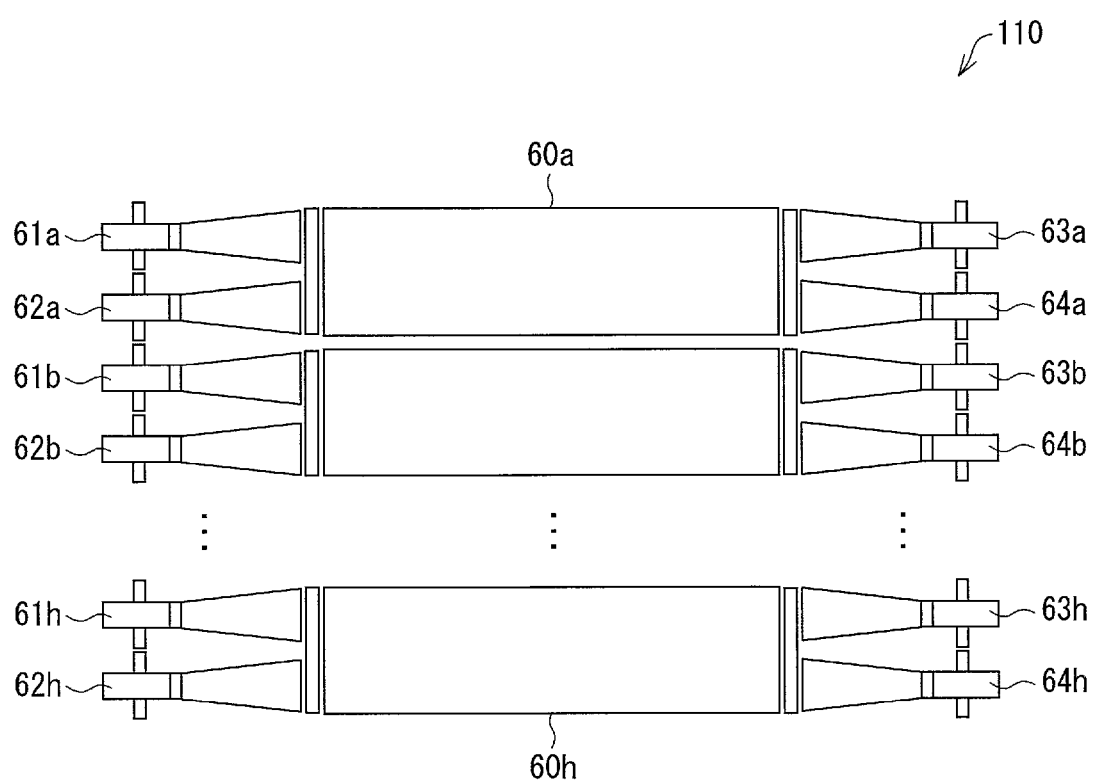

SIMULATED SOLAR IRRADIATION DEVICE AND SPECTRAL ADJUSTMENT METHOD THEREOF

TECHNICAL FIELD

The present invention relates to a simulated sunlight irradiation apparatus and a spectrum adjustment method therefor.

BACKGROUND ART

The importance of a solar cell has been recognized as a clean energy source, and a demand for such a solar cell is increasing. The solar cell is used in various technical fields ranging from power sources for large electric equipment to small power sources for precision electronic devices. If the solar cell is to be widely used in various technical fields, then characteristics of the solar cell, particularly, an output characteristic of the solar cell should be precisely measured. Otherwise, various inconveniences in use of the solar cell may possibly occur. Therefore, especially a technique is demanded which is available to tests, measurements and experiments of the solar cell and which can irradiate a large area with highly-precise simulated sunlight. Major requirements which the simulated sunlight should meet are (i) to make an emission spectrum of the simulated sunlight similar to that of the standard sunlight (set by the Japanese Industrial Standards) and (ii) to make an irradiance of the simulated sunlight substantially equal to that of the standard sunlight. In view of such requirements, a simulated sunlight irradiation apparatus has been developed as a device for irradiating simulated sunlight that meets such requirements. Generally, the simulated sunlight irradiation apparatus is used for measuring an amount of power generated by the solar cell by irradiating a light receiving surface of the solar cell with artificial light (simulated sunlight) whose irradiance is uniform.

For example, Patent Literature 1 discloses a method for calculating by simulation an amount of power generated by solar photovoltaic power generation. This method is for obtaining an amount of power generated by a solar cell in consideration of influences of regional difference, characteristic values of an individual solar cell, an installation mount, and the like. More specifically, Patent Literature 1 discloses a method for obtaining an amount of power generated by a solar cell by first preparing a voltage-current curve (I-V curve) and a power-voltage curve (P-V curve) for specified solar irradiance and solar cell temperature according to a basic characteristic formula for solar cells. This makes it possible to obtain a more precise amount of power generated by a solar cell in consideration of influences of regional difference, characteristic values of an individual solar cell, an installation mount, and the like.

CITATION LIST

Patent Literature

Patent Literature 1
Japanese Patent Application Publication, Tokukai, No. 2005-51014 A (Publication Date: Feb. 24, 2005)

SUMMARY OF INVENTION

Technical Problem

However, solar spectra vary from one another depending on countries or regions. Accordingly, when an amount of power generated by a solar cell is to be calculated for each country or region, it is necessary to have a method for correcting the I-V curve and the P-V curve of Patent Literature 1 in consideration of difference between a spectrum in a standard state (standard sunlight: AM 1.5, solar irradiance: 1 kW/m$^2$, and solar cell temperature: 25° C.) of the solar cell and a solar spectrum in a region where power is generated. However, such a method has not been established. Therefore, currently, the amount of power generated by solar photovoltaic power generation in a region where the power is generated cannot be precisely simulated. Therefore, there is a demand for an irradiation apparatus capable of irradiating simulated sunlight having a solar spectrum corresponding to each country or region.

Further, when a thin-film solar cell is used, a spectral change results in a change in generated carriers in each spectral sensitivity range. Due to such a film characteristic of the thin-film solar cell, generated carriers for each spectral sensitivity range vary when a degree of spectral coincidence of simulated sunlight (a degree of spectral coincidence with a specific solar spectrum) is low. This precludes precise measurement of an amount of generated power in a specific solar spectrum. Therefore, there is a demand for an irradiation apparatus capable of irradiating simulated sunlight having a desired sunlight spectrum and a high degree of spectral coincidence.

The present invention is attained in view of the above. An object of the present invention is to provide a simulated sunlight irradiation apparatus capable of irradiating simulated sunlight having a desired sunlight spectrum and a high degree of spectral coincidence, and a spectrum adjustment method for the simulated sunlight irradiation apparatus.

Solution to Problem

In order to solve the above problem, a simulated sunlight irradiation apparatus according to one embodiment of the present invention includes: a first light source emitting first light; a second light source emitting second light having a spectral distribution different from a spectral distribution of the first light; at least one first optical filter having a transmittance characteristic for controlling a transmittance of the first light; at least one second optical filter having a transmittance characteristic for controlling a transmittance of the second light; a light selecting section causing simulated light to be emitted, by mixing light selected from the first light and the second light having entered the light selecting section, the first light having a transmittance controlled by the at least one first optical filter, the second light having a transmittance controlled by the at least one second optical filter; a light guide plate which the simulated sunlight emitted from the light selecting section enters; a light extracting section causing the simulated sunlight having entered the light guide plate to be extracted through an irradiation surface of the light guide plate, at least one of the at least one first optical filter and the at least one second optical filter being provided so as to be switchable to another optical filter having a transmittance characteristic that is different from the transmittance characteristic of the at least one of the at least one first optical filter and the at least one second optical filter.

In the above arrangement, the simulated sunlight irradiation apparatus according to one embodiment of the present invention is arranged such that at least one of the first optical filter and the second optical filter is switchable to the another optical filter having a transmittance characteristic that is different from the transmittance characteristic of the at least one of the first optical filter and the second optical filter. Accordingly, a spectral of light that enters the light selecting section can be changed, by switching at least one of the first optical filter and the second optical filter to the another optical filter so that a desired spectral distribution is obtained. As a result, the simulated sunlight irradiation apparatus becomes capable of irradiating light having different spectra.

For example assume a case where the first optical filter and the second optical filter are designed in accordance with an AM 1.0 spectrum, while the another optical filter is designed in accordance with an AM 1.5 spectrum. In this case, by switching between (i) at least one of the first optical filter and the second optical filter and (ii) the another optical filter, it is possible to easily switch between AM 1.0 and AM 1.5 spectra of light irradiated by the simulated sunlight irradiation apparatus. In this way, by switching as appropriate at least one of the first optical filter and the second optical filter to another filter having a transmittance characteristic different from that of the at least one of the first optical filter and the second optical filter, it becomes possible to irradiate simulated sunlight having a desired sunlight spectrum and a high degree of spectral coincidence.

Further, in order to solve the above problem, a spectrum adjustment method for the simulated sunlight irradiation apparatus according to one embodiment of the present invention includes the step of adjusting a spectral distribution of the simulated sunlight by switching at least one of the at least one first optical filter and the at least one second optical filter to another optical filter having a transmittance characteristic that is different from the transmittance characteristic of the at least one of the at least one first optical filter and the at least one second optical filter.

According to the above method, by switching as appropriate at least one of the first optical filter and the second optical filter to the another optical filter having a transmittance characteristic different from that of the at least one of the first optical filter and the second optical filter so that a desired spectral distribution is obtained, it becomes possible to irradiate simulated sunlight having a desired sunlight spectrum and a high degree of spectral coincidence.

For a fuller understanding of the nature and advantages of the invention, reference should be made to the ensuing detailed description taken in conjunction with the accompanying drawings.

Advantageous Effects of Invention

According to one embodiment of the present invention, by switching as appropriate at least one of the first optical filter and the second optical filter to another optical filter having a transmittance characteristic different from that of the at least one of the first optical filter and the second optical filter so that a desired spectral distribution is obtained, it becomes possible to irradiate simulated sunlight having a desired sunlight spectrum and a high degree of spectral coincidence.

BRIEF DESCRIPTION OF DRAWINGS

FIG. 1 is a view illustrating a part of a light introducing section in a simulated sunlight irradiation apparatus according to one embodiment of the present invention.

FIG. 15 is a view illustrating a substantial arrangement of a simulated sunlight irradiation apparatus according to still another embodiment of the present invention.

DESCRIPTION OF EMBODIMENTS

First Embodiment (Arrangement of Simulated Sunlight Irradiation Apparatus 100)

Figure 2:
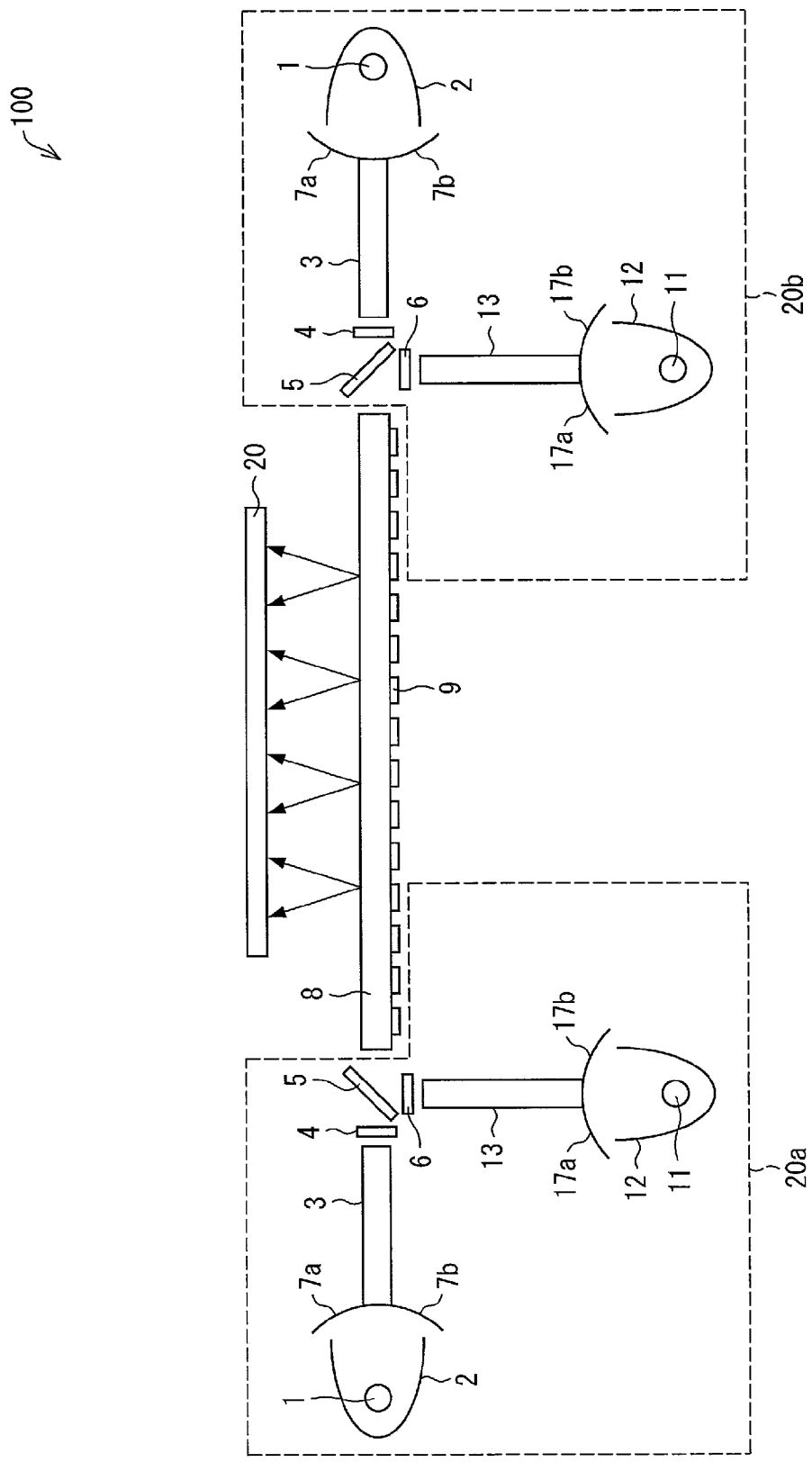
FIG. 2 is a view illustrating a substantial arrangement of the simulated sunlight irradiation apparatus according to one embodiment of the present invention.

The following discusses one embodiment of the present invention with reference to drawings. First, the following discusses in detail a simulated sunlight irradiation apparatus 100 for irradiating an irradiation target object 20 with simulated sunlight, with reference to FIG. 2. FIG. 2 is a view illustrating a substantial arrangement of the simulated sunlight irradiation apparatus 100. The simulated sunlight is a kind of artificial light and has an emission spectrum extremely similar to that of natural light (sunlight). The simulated sunlight irradiation apparatus 100 of First Embodiment irradiates the irradiation target object 20 such as a solar cell, with synthesized light of xenon light and halogen light as simulated sunlight.

As illustrated in FIG. 2, the simulated sunlight irradiation apparatus 100 includes light introducing sections 20a and 20b for introducing light, a light guide plate 8, and a light extracting section 9. The simulated sunlight irradiation apparatus 100 emits simulated sunlight (indicated by arrows in FIG. 2) from an irradiation surface (top surface) of the light guide plate 8. The following discusses in detail the simulated sunlight irradiation apparatus 100. Note that in the following discussion, an irradiation surface side of the light guide plate 8 is referred to as an upper side and a side opposite to the irradiation surface side of the light guide plate 8 is referred to as a reverse side (back side).

The light guide plate 8 is provided between the light introducing sections 20a and 20b that are disposed so as to face each other. Respective side surfaces of the light guide plate 8 are irradiated with simulated sunlight by the light introducing sections 20a and 20b. Then, the light guide plate 8 irradiates this simulated sunlight through the irradiation surface (top surface) of the light guide plate 8.

The light extracting section 9 is formed on a bottom surface (back surface) of the light guide plate 8. The light extracting section 9 causes the stimulated sunlight emitted from the light introducing sections 20a and 20b to be extracted through the irradiation surface of the light guide plates 8. More specifically, the light (simulated sunlight) having entered the light guide plate from the light introducing sections 20a and 20b propagates inside the light guide plate 8. At this time, light hitting on the light extracting section 9 is reflected and led to the irradiation surface of the light guide plate 8 and emitted outward through the irradiation surface. This makes it possible to uniformly irradiate the simulated sunlight through a larger irradiation surface. Note that the light extracting section 9 can be made of, for example, a scatterer and thereby lead the simulated sunlight inside the light guide plate 8 to the irradiation surface by scattering the simulated sunlight within the light guide plate 8. Further, by changing a pattern of the scatterer, unevenness in irradiance can also be adjusted.

The light introducing sections 20a and 20b are provided on respective side surfaces of the light guide plate 8. In the simulated sunlight irradiation apparatus 100, the light introducing sections 20a and 20b emit simulated sunlight to respective ends of the light guide plate 8. This makes it possible to cause a higher intensity (irradiance) of simulated sunlight to be emitted through the irradiation surface. However, the light introducing sections 20a and 20b are not necessarily provided to the respective ends of the light guide plate 8. Either one of the light introducing sections 20a and 20b may be provided to only one end of the light guide plate 8. In other words, the simulated sunlight irradiation apparatus 100 does not need to include the light introducing section 20b. Note that the light introducing section 20b has an optical component arrangement identical to that of the light introducing section 20a. Therefore, the following discusses an arrangement of the light introducing section 20a as an example so as to describe an arrangement of each of the light introducing sections 20a and 20b.

More specifically, the light introducing section 20a includes a halogen light source 1 (second light source), a light collecting element 2, a taper coupler 3, an optical filter 4 (second optical filter), wavelength selecting means 5 (light selecting section), an optical filter 6 (first optical filter), light shielding members 7a and 7b, a xenon light source 11 (first light source), a light collecting element 12, a taper coupler 13, and light shielding members 17a and 17b.

In the light introducing section 20a, light emitted from the halogen light source 1 and light emitted from the xenon light source 11 are mixed by the wavelength selecting means 5 so as to generate simulated sunlight. Then, the light introducing section 20a irradiates a side surface (incidence plane) of the light guide plate 8 with thus generated simulated sunlight. More specifically, the halogen light source 1 and the xenon light source 11 are light sources provided in the simulated sunlight irradiation apparatus 100. The halogen light source 1 and the xenon light source 11 emit light having spectral distributions required for generation of the simulated sunlight. The light emitted from the halogen light source 1 and the light emitted from the xenon light source 11 differ from each other in spectral distribution. The halogen light source 1 emits much long-wavelength light necessary for the simulated sunlight. Meanwhile, the xenon light source 11 emits much short-wavelength light necessary for the simulated sunlight.

(Arrangements of Light Introducing Sections 20a and 20b)

Figures 3, 4:
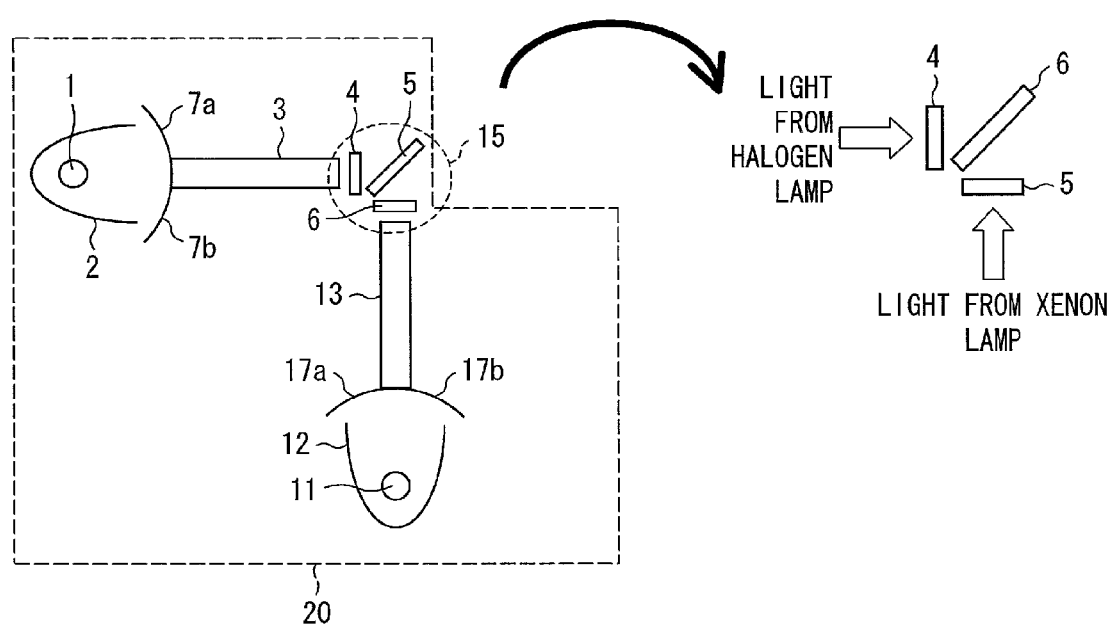
FIG. 3 is a view illustrating a part of the light introducing section in the simulated sunlight irradiation apparatus according to one embodiment of the present invention.
FIG. 4 is a view illustrating a part of the light introducing section in the simulated sunlight irradiation apparatus according to one embodiment of the present invention.

The following discusses the arrangement of each of the light introducing sections 20a and 20b, with reference to FIGS. 3 and 4. FIGS. 3 and 4 each are a view illustrating a part of the light introducing section 20a in the simulated sunlight irradiation apparatus 100. FIG. 3 is a view illustrating the light introducing section 20a as viewed from the irradiation surface (top surface) side of the light guide plate 8 and FIG. 4 is a view illustrating the light introducing section 20a as viewed from a side surface of the light guide plate 8.

As illustrated in FIG. 3, the halogen light source 1 is surrounded by the light collecting element 2 in all directions except a direction in which light is emitted toward the taper coupler 3 and the xenon light source 11 is surrounded in all directions except a direction in which light is emitted toward the taper coupler 13. In this arrangement, light that does not travel toward the taper couplers 3 and 13 among light emitted from the halogen light source 1 and the xenon light source 11 is caused to be reflected by the light collecting elements 2 and 12 and emitted toward the taper couplers 3 and 13. In other words, the light collecting elements 2 and 12 collect light emitted from each light source and cause thus collected light to be emitted towards the taper couplers 3 and 13. The light collecting elements 2 and 12 each are an ellipse mirror, a parabolic mirror, or the like and increase radiation directivity of light emitted from each light source. This results in emission of both light emitted directly from the halogen light source 1 and the xenon light source 11 and light reflected by the light collecting elements 2 and 12 towards the taper couplers 3 and 13. Therefore, the light emitted from the halogen light source 1 and the xenon light source 11 is effectively utilized.

The taper couplers 3 and 13 are optical elements provided in the light introducing section 20a. The taper coupler 3 is provided between the halogen light source 1 and the wavelength selecting means 5. Meanwhile, the taper coupler 13 is provided between the xenon light source 11 and the wavelength selecting means 5. One end of the taper coupler 3 is provided so as to be close to the halogen light source 1 and the other end is provided so as to be close to the wavelength selecting means 5. Meanwhile, one end of the taper coupler 13 is provided so as to be close to the xenon light source 11 and the other end is provided so as to be close to the wavelength selecting means 5. The taper coupler 3 and 13 are disposed so that a direction of light emitted from the taper coupler 3 (light from the halogen light source 1) makes an angle of 90° with light emitted from the taper coupler 13 (light from the xenon light source 11).

Here, as illustrated in FIG. 4, the light introducing section 20a includes the optical filters 4 and 6 so that the spectral distribution of the simulated sunlight approximates the spectral distribution of the standard sunlight. The optical filters 4 and 6 are optical elements each adjusting a spectral distribution (controlling a transmittance) of light emitted from one of the halogen light source 1 and the xenon light source 11 (taper couplers 3 and 13). The optical filters 4 and 6 each are usually called an air mass filter (spectral adjusting filter). In the arrangement of the simulated sunlight irradiation apparatus 100 of First embodiment, the optical filters 4 and 6 each are arranged so as to be switchable with another optical filter. For simplification of a drawing, FIG. 4 illustrates only the optical filters 4 and 6. Arrangements of the optical filters 4 and 6 are discussed in detail later.

The optical filter 4 is provided so as to be close to an exit surface of the taper coupler 3 for the halogen light source 1. The optical filter 4 adjusts a spectral distribution of xenon light that exits from the taper coupler 3. Similarly, the optical filter 6 is provided so as to be close to an exit surface of the taper coupler 13 for the xenon light source 11. The optical filter 6 adjusts a spectral distribution of halogen light that exits from the taper coupler 13. This allows the light whose spectra are adjusted by the optical filters 4 and 6 to enter the wavelength selecting means 5.

Figure 5:
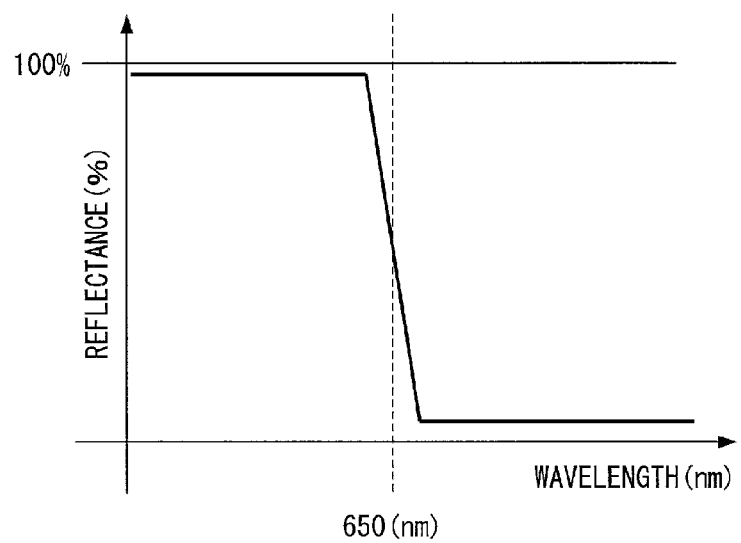
FIG. 5 is a graph showing a transmittance for light having entered wavelength selecting means at an incident angle of 45° according to one embodiment of the present invention.

FIG. 5 shows a transmittance characteristic of the wavelength selecting means 5. FIG. 5 is a graph showing a transmittance for light having entered the wavelength selecting means 5 at an incident angle of 45°. As illustrated in FIG. 5, the wavelength selecting means 5 has a function of selecting wavelengths. In other words, the wavelength selecting means 5 not only selects (extracts) light necessary for simulated sunlight from light emitted from the halogen light source 1 and the xenon light source 11, but also synthesizes the simulated sunlight by mixing thus selected light. More specifically, the wavelength selecting means 5 reflects light having wavelengths less than a predetermined wavelength (short wavelengths shorter than the predetermined wavelength (650 nm in FIG. 5)), while transmitting light having wavelengths equal to and more than the predetermined wavelength (long wavelengths longer than the predetermined wavelength). In other words, the wavelength selecting means 5 has a function of transmitting long-wavelength light necessary for the simulated sunlight while reflecting short-wavelength light necessary for the simulated sunlight. Thereby, the wavelength selecting means 5 synthesizes the simulated sunlight by mixing the long-wavelength light and the short-wavelength light.

More specifically, the light emitted from the halogen light source 1 includes many long-wavelength components necessary for the simulated sunlight. Meanwhile, the light emitted from the xenon light source includes many short-wavelength components necessary for the simulated sunlight. For the wavelength selecting means 5, a boundary wavelength is set in a range of 600 nm to 800 nm. Accordingly, the wavelength selecting means 5 reflects light having wavelengths shorter than this boundary wavelength, while transmitting light having wavelengths equal to or longer than the boundary wavelength. That is, the wavelength selecting means 5 transmits only light (light of long-wavelength components) having wavelengths equal to and longer than the boundary wavelength among the light emitted from the halogen light source 1. Meanwhile, the wavelength selecting means 5 reflects only light (light of short-wavelength components) having wavelengths shorter than the boundary wavelength among the light emitted from the xenon light source 11.

Assume a case where, for example, for light having wavelengths of 700 nm and longer, the light from the halogen light source 1 is employed, while for light having wavelengths shorter than 700 nm, the light from the xenon light source 11 is employed. In this case, the boundary wavelength between wavelengths for reflection and transmission of the wavelength selecting means 5 is at the wavelength of 700 nm. In other words, the wavelength selecting means 5 has a characteristic in which light having wavelengths shorter than the wavelength of 700 nm is reflected while light having wavelengths of 700 nm and longer is transmitted. This allows only light having wavelengths necessary for simulated sunlight to be selected by the wavelength selecting means 5. Thus selected light is synthesized and emitted as simulated sunlight. Note that the boundary wavelength of light for reflection or transmission of the wavelength selecting means 5 may be set as appropriate. However, preferably, the boundary wavelength is selected in a range of 600 nm to 700 nm so that a bright light component in an emission spectrum of the xenon light source 11 is reduced. Further, the wavelength selecting means 5 can be a wavelength dependent mirror or filter. For example, a cold mirror, a hot mirror, or the like can be used as the wavelength selecting means 5.

As described above, the wavelength selecting means 5 extracts light of long-wavelength components necessary for synthesis of simulated sunlight which long-wavelength components are contained in the light emitted from the halogen light source 1 and light of short-wavelength components necessary for synthesis of the simulated sunlight which short-wavelength components are contained in the light emitted from the xenon light source 11. At this time, light of short-wavelength components of the halogen light source 1 not under spectral control is removed. Similarly, light of long-wavelength components of the xenon light source 11 not under spectral control is removed. Therefore, an emission spectrum of simulated sunlight can approximate more the emission spectrum of the standard sunlight.

(Principle of Simulated Sunlight Irradiation)

The halogen light source 1 and the xenon light source 11 are non-directional light sources. Accordingly, the light emitted from these light sources is diffusion light that diffuses. Accordingly, it is preferable that directivity of the light emitted from these light sources be controlled so that the light emitted from each of these light sources enter the wavelength selecting means 5 at an predetermined incident angle. In First Embodiment, as illustrated in FIG. 3, each of the taper couplers 3 and 13 has a pair of opposed surfaces that has a taper shape (trapezoidal shape). That is, a width (cross section) of each of the taper couplers 3 and 13 gradually increases from an incident surface to the exit surface of each of the taper couplers 3 and 13. This structure improves directivity (radiation angle) of the light emitted from the halogen light source 1 and the xenon light source 11 while the light is being reflected a plurality of times on side surfaces of the taper couplers 3 and 13. Consequently, light having a high directivity (under control of radiation angle) is caused to exit from the exit surface of each of the taper couplers 3 and 13. Note that the radiation angle of light emitted from each of the taper couplers 3 and 13 is controlled by respective inclination angles of side surfaces of each of the taper couplers 3 and 13 and a length of each of the taper couplers 3 and 13 in a direction in which light travels. Therefore, radiation directivity of the light emitted from the halogen light source 1 is first increased by the light collecting element 2 and then further increased by the taper coupler 3, while radiation directivity of the xenon light source 11 is first increased by the light collecting element 12 and then further increased by the taper coupler 13. The light having thus increased directivity passes the optical filters 4 and 6 each for adjusting an emission spectrum, and then enters the wavelength selecting means 5.

An advantage of increasing the directivity of light by use of the taper couplers 3 and 13 is relevant to respective structures of the optical filters 4 and 6. More specifically, the optical filters 4 and 6 each have a structure in which a plurality of thin layers are stacked. Accordingly, a characteristic in transmittance varies more as an incident angle of the light entering each of the optical filters 4 and 6 shifts to a greater extent from an angle of normal incident light to each of the optical filters 4 and 6. In other words, when light having poor directivity enters any of the optical filters 4 and 6, a generated simulated light has a spectral distribution that diverges from a spectral distribution of the standard sunlight.

However, by increasing directivity of light by use of the taper couplers 3 and 13, it becomes possible to generate simulated sunlight whose spectral distribution is similar to that of the standard sunlight. More specifically, the light emitted from each of the taper couplers 3 and 13 has an incident angle in a range of ±30° or smaller with respect to corresponding one of the optical filters 4 and 6. The optical filters 4 and 6 each is designed so that a predetermined transmittance characteristic can be obtained in a case where light enters each of the optical filters 4 and 6 at an incident angle of 0°, that is, orthogonally to each of the optical filters 4 and 6. Accordingly, a phase shift (approximated at 1-cos 30°) of incident light to each of the optical filters 4 and 6 in a vertical direction is 14% at the maximum. Even in a case where the incident angle is increased from 0° to 30°, the phase shift takes a value in a range of 0% to 14% and this value is an average (ordinary) value. This results in a smaller change in transmittance of each of the optical filters 4 and 6 from a transmittance of a case where the light enters each of the optical filters 4 and 6 at an incident angle of 0°.

As described above, because light having a high directivity enters each of the optical filters 4 and 5, controllability of a spectrum is improved. This makes it possible to generate simulated sunlight that is more similar to the standard sunlight. As a result, the light obtained through passage of each of the optical filters 4 and 6 becomes more similar to actual sunlight. This consequently makes the simulated sunlight be light in Class MS defined by Japanese Industrial Standards (JIS) which light has a shift (a degree of spectral coincidence) from the standard sunlight within ±5%.

Further, because the simulated sunlight irradiation apparatus 100 includes the taper couplers 3 and 13, directivity of light is controlled so that xenon light enters the optical filter 6 and the wavelength selective means 5 at a predetermined angle and halogen light enters the optical filter 6 and the wavelength selective means 5 at a predetermined angle. This suppresses a loss in light intensity of the xenon light and the halogen light before the xenon light and the halogen light reaches the wavelength selecting means 5. Note that with only one of the taper couplers 3 and 13, it is possible to control directivity of the xenon light or the halogen light and thereby cause the xenon light or the halogen light to enter the wavelength selecting means 5 at a predetermined angle. Further, in the simulated sunlight irradiation apparatus 100, the halogen light source 1 and the xenon light source 11 are employed as light sources for obtaining simulated sunlight. However, kinds of the light sources and a combination of the light sources are not limited to the above kinds and combination, but may be selected as appropriate so that an emission spectrum of the simulated sunlight becomes similar or identical to that of the standard sunlight. Further, a type of the light sources may be a dot light source or the like other than a bar light source.

(Generation of Simulated Sunlight Having Desired Spectrum)

Figure 6:
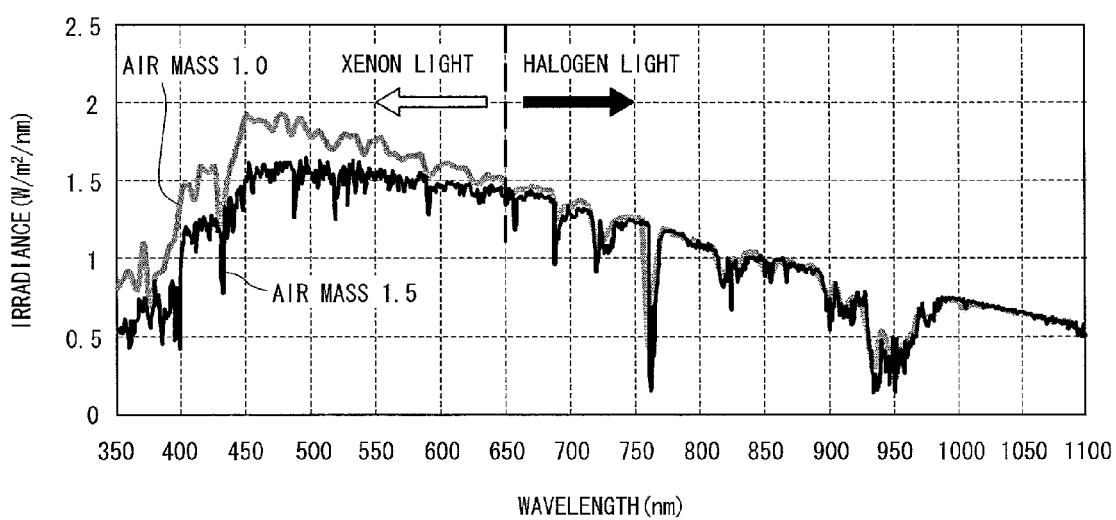
FIG. 6 is a graph showing respective spectral distributions for Air Mass 1.0 and Air Mass 1.5.

FIG. 6 is a graph showing respective spectral distributions for Air Mass 1.0 (hereinafter, referred to as AM 1.0) in a near-equatorial region and Air Mass 1.5 (hereinafter, referred to as AM 1.5) in a mid-latitude region. As illustrated in FIG. 6, the latitude varies depending on each region and the sunlight varies in spectrum depending on the latitude. More specifically, spectra in a range of wavelengths of 650 nm and shorter largely differ from each other between respective regions. Such difference in spectral strength influences power generation characteristics. The following provides reasons for this.

Figure 7:
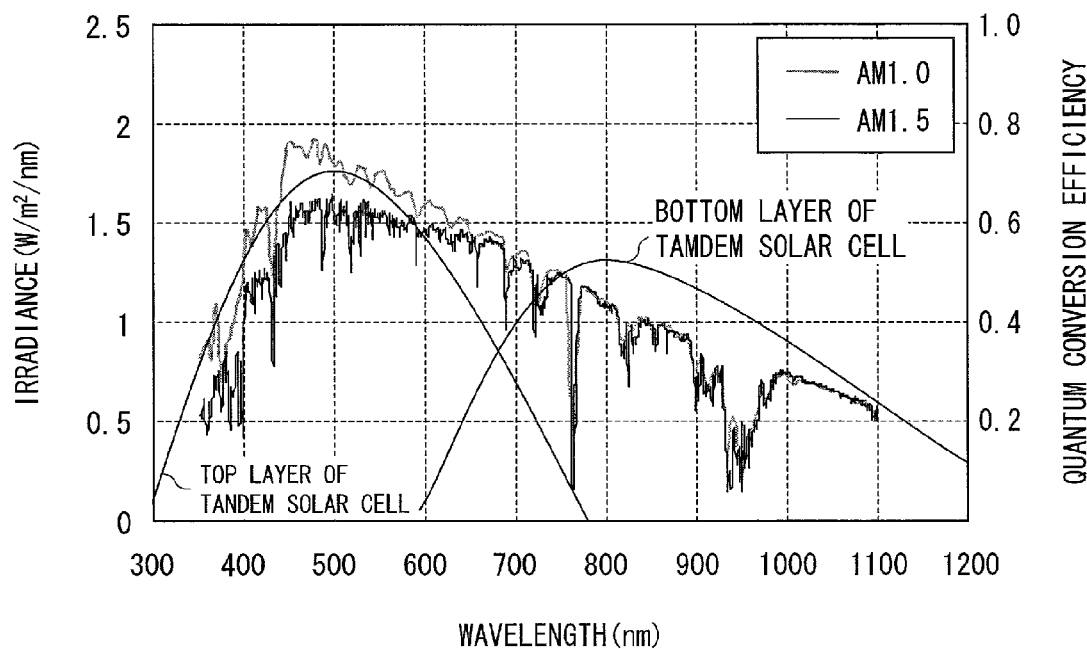
FIG. 7 shows a relation of a spectral sensitivity and a spectral distribution of a tandem thin-film solar cell.

In general, a spectral sensitivity of a thin-film solar cell is designed in accordance with a specific spectral distribution. Accordingly, when a spectral distribution for power generation varies from the specific spectral distribution, an intended amount of power may not be generated. FIG. 7 shows a relation of a spectral sensitivity and a spectral distribution, for example, for a tandem thin-film solar cell whose spectral sensitivities for both top and bottom layers are designed in accordance with AM 1.5. As shown in FIG. 7, the respective spectral sensitivities of both the top layer and the bottom layer of the tandem thin-film solar cell are set in accordance with AM 1.5. Accordingly, even if the tandem thin-film solar cell is used under the sun whose spectrum is at AM 1.0, an intended amount of power cannot be generated. When an amount of power generated under the sun whose spectrum is at AM 1.0 is to be evaluated for a thin-film solar cell designed to have a spectral sensitivity in accordance with AM 1.5, the amount of power cannot be precisely evaluated unless a spectrum of light (simulated sunlight) with which the thin-film solar cell is irradiated is controlled to AM 1.0.

Accordingly, in First Embodiment, a spectrum of light that the simulated sunlight irradiation apparatus 100 irradiates is controlled by switching each of the optical filters 4 and 6 to another optical filter. More specifically, First Embodiment utilizes a characteristic that the optical filters 4 and 6 are capable of independently controlling transmittances of the light from the halogen light source 1 and the light from the xenon light source 11, respectively. The following discusses this control in detail with reference to FIG. 1. FIG. 1 is a view illustrating a part of the light introducing section 20a in the simulated sunlight irradiation apparatus 100.

As illustrated in FIG. 1, in the simulated sunlight irradiation apparatus 100, at least one of the optical filters 4 and 6 is provided so as to be switchable to another optical filter having a transmittance characteristic that is different from that of the at least one of the optical filters 4 and 6. More specifically, the optical filter 4 and an optical filter 14 (another optical filter) are switchable with each other, while the optical filter 6 and an optical filter 16 (another optical filter) are switchable with each other. The optical 4 has a different transmittance characteristic from the optical filter 14 and the optical 6 has a different transmittance characteristic from the optical filter 16. Therefore, by switching at least one of the optical filters 4 and 6 to another filter (optical filter 14 or 16), a spectrum of light to be transmitted varies. In other words, by switching between the optical filter 4 and the optical filter 14 or between the optical filter 6 and the optical filter 16, the simulated sunlight irradiation apparatus 100 irradiates light having different spectra.

TABLE 1

| Wavelength Band (nm) | | 350-400 | 400-450 | 450-500 | 500-550 | 550-600 | 600-650 |
|---|---|---|---|---|---|---|---|
| Intensity Ratio With Respect To Standard Sunlight (AM 1.0/AM 1.5) | | 1.45 | 1.24 | 1.21 | 1.15 | 1.11 | 1.08 |
| Average Transmittance (%) | AM 1.5 | 31.4 | 83.4 | 70.3 | 90.7 | 82.7 | 87.2 |
| | AM 1.0 | 41.8 | 95 | 78 | 95.7 | 84.7 | 86.4 |

For example, filters having respective transmittance characteristics as shown in Table 1 are used as the optical filters 4 and 16. More specifically, a filter optimized for an AM 1.0 spectrum (i.e., a filter having a transmittance characteristic that causes the xenon light to have an AM 1.0 spectrum) is used as the optical filter 6 and a filter optimized for an AM 1.5 spectrum (i.e., a filter having a transmittance characteristic that causes the xenon light to have an AM 1.5 spectrum) is used as the optical filter 16. In such a case, by switching between the optical filter 6 and the optical filter 16, a light transmittance from the xenon light source 11 is controlled. This makes it possible to switch between AM 1.0 and AM 1.5 spectra of light from the xenon light source 11.

As shown in FIG. 6, the AM 1.0 and AM 1.5 spectra largely differ from each other in spectrum at wavelengths in a range of 650 nm and shorter. Accordingly, only by switching between the optical filter 6 optimized for an AM 1.0 spectrum and the optical filter 16 optimized for an AM 1.5 spectrum, AM 1.0 and AM 1.5 spectra of light which the simulated sunlight irradiation apparatus 100 irradiates can be easily switched.

Here, as shown in FIG. 6, there is a slight different in spectrum at wavelengths in a range of 650 nm and longer, between the AM 1.0 spectrum and the AM 1.5 spectrum. Therefore, by (i) employing a filter optimized for the AM 1.0 spectrum (i.e., a filter having a transmittance characteristic that causes halogen light to have the AM 1.0 spectrum) as the optical filter 4 and a filter optimized for the AM 1.5 spectrum (i.e., a filter having a transmittance characteristic that causes halogen light to have an AM 1.5 spectrum) as the optical filter 14 and (ii) switching between the optical filter 4 and the optical filter 14, the AM 1.0 spectrum and AM 1.5 spectrum of light from the halogen light 1 can be switched. In other words, by switching between the optical filter 4 optimized for the AM 1.0 spectrum and the optical filter 14 optimized for the AM 1.5 spectrum, a spectrum having wavelengths of 650 nm and longer can be finely adjusted. This makes it possible to make a spectrum of light which the simulated sunlight irradiation apparatus 100 irradiates be more similar to each of the AM 1.0 spectrum and the AM 1.5 spectrum. This makes it possible to irradiate a simulated sunlight having a higher degree of spectral coincidence.

In this way, the simulated sunlight irradiation apparatus 100 is capable of generating simulated sunlight having a desired spectrum only by switching the optical filter 6 out of the optical filters 4 and 6. However, by switching between the optical filters 4 and 14, the spectrum of the simulated sunlight can be made more similar to a desired spectrum.

Therefore, in the simulated sunlight irradiation apparatus 100, the optical filters 4 and 14 respectively optimized for different spectra and the optical filters 6 and 16 respectively optimized for different spectra may be prepared and optical filters to be used may be selected in accordance with a desired spectrum. In other words, optical filters should be switched as appropriate in accordance with a wavelength band for which spectral adjustment is desired. In the above arrangement, by switching at least one of the optical filters 4 and 6 to another optical filter (optical filter 14 or 16), it is possible to irradiate simulated sunlight that has a desired sunlight spectrum and that has a high degree of spectral coincidence.

(Method for Switching Filters)

Figure 8:
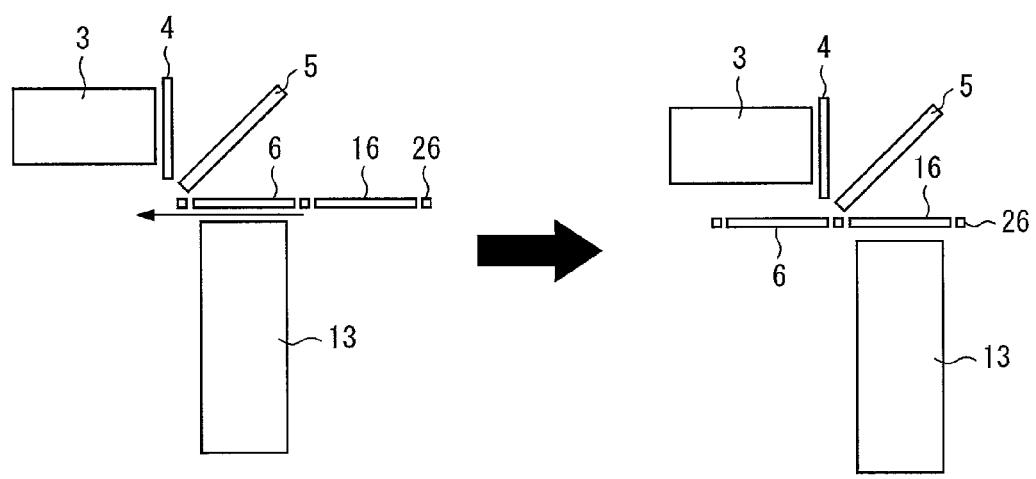
FIG. 8 is a cross-sectional view illustrating the step of switching between optical filters according one embodiment of the present invention.
Figure 9:
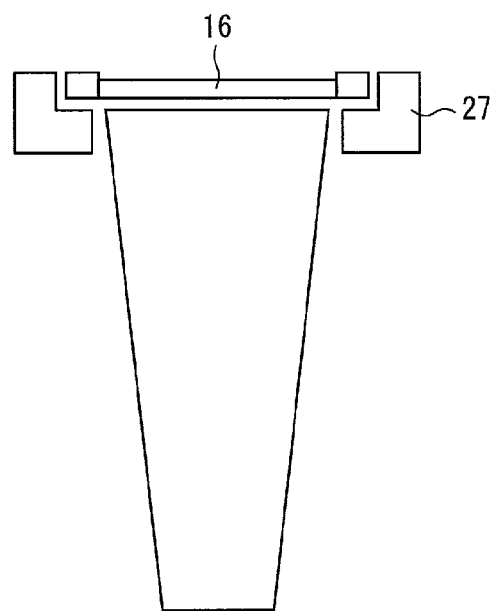
FIG. 9 is a view illustrating a part of a light introducing section in the simulated sunlight irradiation apparatus according one embodiment of the present invention.
Figure 10:
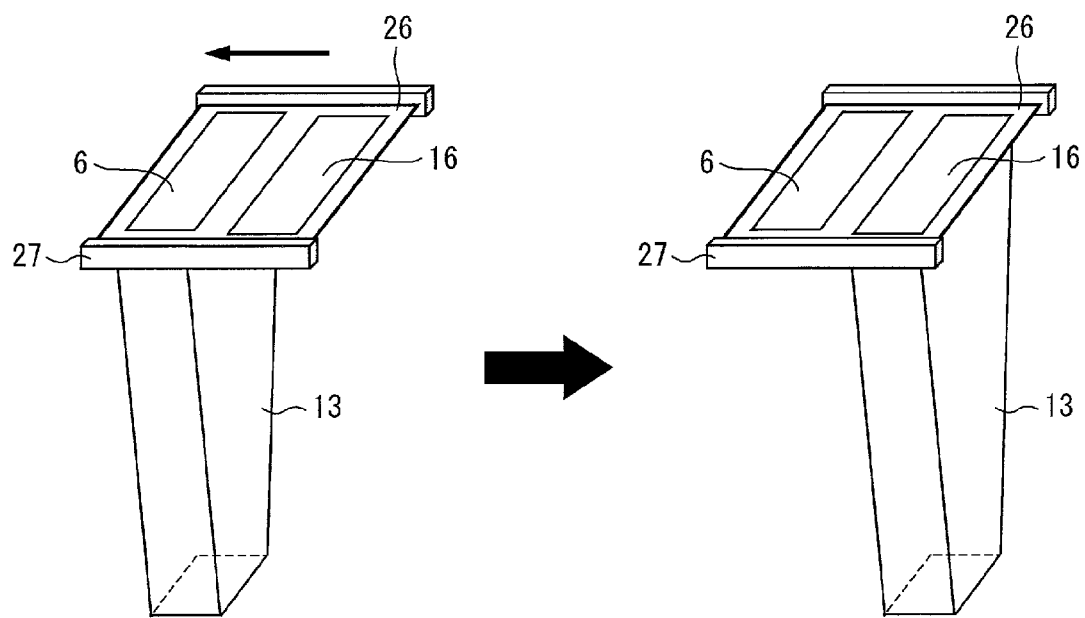
FIG. 10 is a perspective view illustrating the step of switching between optical filters according one embodiment of the present invention.
Figure 11:
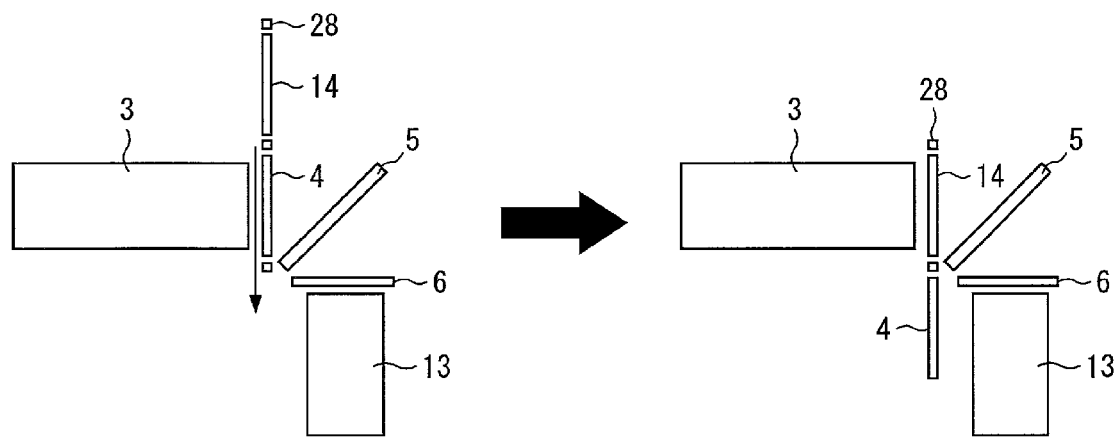
FIG. 11 is a cross-sectional view illustrating the step of switching between optical filters according one embodiment of the present invention.
Figure 12:
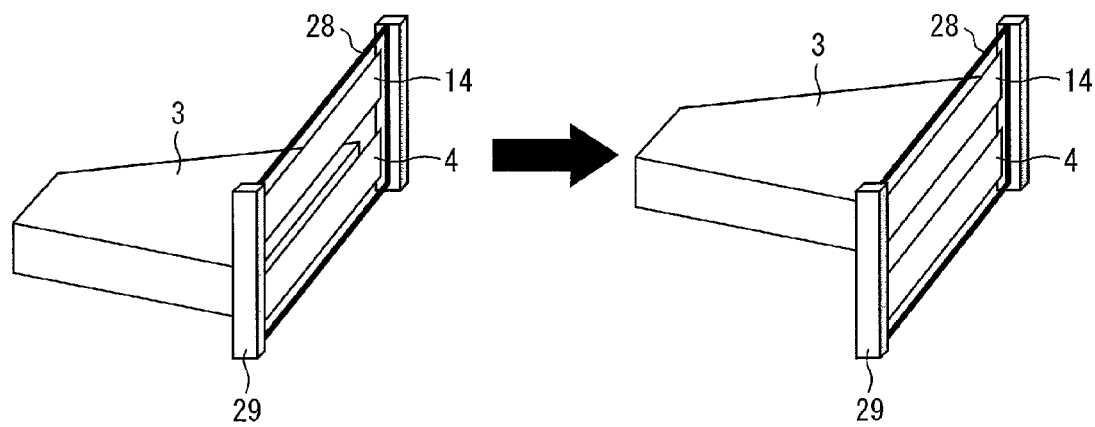
FIG. 12 is a perspective view illustrating the step of switching between optical filters according one embodiment of the present invention.

The following discusses a method for switching between the optical filters 4 and 4 and between the optical filters 6 and 16, with reference to FIGS. 8 to 12. FIGS. 8 and 11 are cross sectional views each illustrating the step of switching between optical filters. FIG. 9 is a view illustrating a part of the light introducing section 20a in the simulated sunlight irradiation apparatus 100. FIGS. 10 and 12 are perspective views each illustrating the step of switching between optical filters.

As illustrated in FIG. 8, the optical filter 6 and the optical filter 16 are set in a filter slider 26 and this filter slider 26 is provided between the taper coupler 13 and the wavelength selecting means 5. This filter slider 26 moves in a left-to-right or right-to-left direction of a drawing sheet of FIG. 8, so as to cause the optical filters 6 and 16 to move between the taper coupler 13 and the wavelength selecting means 5. Accordingly, this switches between a state where the optical filter 6 is positioned between the taper coupler 13 and the wavelength selecting means 5 (a state on the left of FIG. 8) and a state in which the optical filter 16 is positioned between the taper coupler 13 and the wavelength selecting means 5 (a state on the right of FIG. 8). In other words, this switches between a state in which light from the taper coupler 13 passes the optical filter 6 and a state in which light from the taper coupler 13 passes the optical filter 16. In this way, the optical filter 6 and the optical filter 16 are switched, so that a spectrum of light from the xenon light source 11 is adjusted.

In such adjustment, the filter slider 26 can be moved by use of a guiding section 27, as illustrated in FIG. 9. FIG. 9 is a cross sectional view of the light introducing section 20a illustrated in FIG. 8, taken along line in a vertical direction of the drawing sheet of FIG. 8. As illustrated in FIG. 10, the filter slider 26 can be moved in a left-to-right or right-to-left direction of a drawing sheet of FIG. 10 by movement of the guiding section 27.

Similarly, the optical filter 4 and the optical filter 14 are switched. As illustrated in FIG. 11, the optical filter 4 and the optical filter 14 are set in a filter slider 28 and this filter slider 28 is provided between the taper coupler 3 and the wavelength selecting means 5. The filter slider 28 moves in an up-and-down direction of a drawing sheet of FIG. 11 and this movement causes the optical filter 4 and the optical filter 14 to move between the taper coupler 3 and the wavelength selecting means 5. In other words, this switches between a state in which the optical filter 4 is positioned between the taper coupler 3 and the wavelength selecting means 5 (a state on the left of FIG. 11) and a state in which the optical filter 14 is positioned between the taper coupler 13 and the wavelength selecting means 5 (a state on the right of FIG. 11). In other words, this switches between a state in which light from the taper coupler 3 passes the optical filter 4 and a state in which light from the taper coupler 3 passes the optical filter 14. In this way, the optical filter 4 and the optical filter 14 are switched, so that a spectrum of light from the halogen light source 1 is adjusted.

In such adjustment, the filter slider 28 can also be moved by use of a guiding section 29, as illustrated in FIG. 12. The filter slider 28 can be moved in an up-and-down direction of a drawing sheet of FIG. 12, by movement of a guiding section 27.

Second Embodiment (Plurality of Optical Filters)

Figure 13:
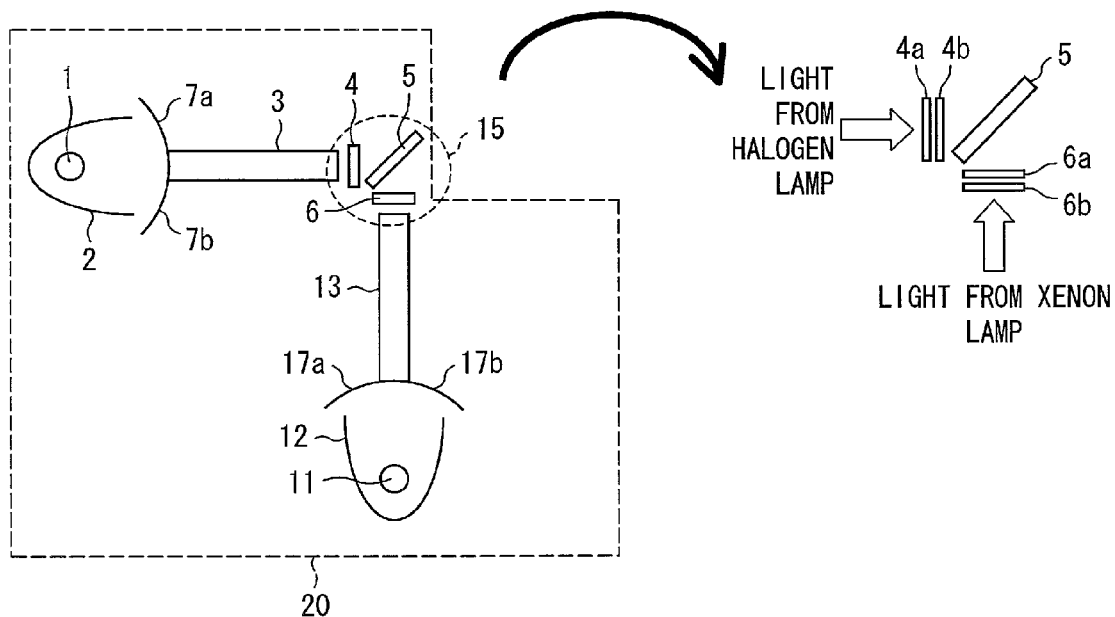
FIG. 13 is a view illustrating a part of a light introducing section in a simulated sunlight irradiation apparatus according to another embodiment of the present invention.

The following discusses another embodiment of the present invention with reference to drawings. Second Embodiment provides an arrangement that allows for more precise control of a spectral change by switching between optical filters. FIG. 13 is a view illustrating a part of a light introducing section in a simulated sunlight irradiation apparatus according to Second Embodiment of the present invention.

A simulated sunlight irradiation apparatus 100 according to First Embodiment includes optical filters 4 and 6 each made of one filter, in each light source. However, as illustrated in FIG. 13, the optical filters 4 and 6 each may be made of a plurality of filters. In FIG. 13, the optical filter 4 is made of two optical filters 4a and 4b and the optical filter 6 is made of two optical filters 6a and 6b.

For example, filters having respective transmittance adjustment wavelength bands in a range of 350 nm to 500 nm and a range of 500 nm to 650 nm are used as the optical filters 6a and 6b, respectively. In this case, if the optical filters 6a and 6b are filters optimized for AM 1.0, AM 1.0 and AM 1.5 spectra of light from the xenon light source 11 can be switched, by switching between (i) the optical filters 6a and 6b and (ii) optical filters 16a and 16b (not illustrated) optimized for AM 1.5. In particular, the wavelength bands in which transmittances are to be adjusted respectively by the optical filters 6a and 6b each are finely divided into smaller wavelength sub-bands. This makes it possible to perform finer spectral adjustment of the wavelength bands. More specifically, in accordance with a wavelength band in which spectral adjustment is desired, an optical filter for adjusting a transmittance in the wavelength band should be selected as appropriate from the optical filters 6a and 6b, and then, thus selected filter should be switched with another filter (optical filter 16a or 16b). This makes it possible to generate simulated sunlight having a spectrum more similar to a desired sunlight spectrum.

The same applies to the optical filters 4a and 4b. By fine division of wavelength bands in which transmittances are to be adjusted respectively by the optical filters 4a and 4b, finer spectral adjustment of the wavelength bands can be performed. Note that the optical filters 4a, 4b, 6a and 6b are not specifically limited in respective transmittance adjustment wavelength bands. The transmittance adjustment wavelength bands only need to be set in accordance with a desired sunlight spectrum. In other words, the optical filters 4 and 6 each should be made of a plurality of optical filters according to need, and the number of the plurality of optical filters is not limited to two but may be three or more.

Note that only at least one of the optical filters 4a, 4b, 6a and 6b needs to be switchable with another optical filter. In other words, it is only necessary that only at least one of the plurality of optical filters 4a and 4b constituting the optical filter 4, or at least one of the plurality of optical filters 6a and 6b constituting the optical filter 6 is switchable with another optical filter (optical filter 14a, 14b, 16a or 16b). In this arrangement, one of halogen light or xenon light undergoes spectral adjustment and the spectral adjustment is performed for only a wavelength band for which spectral adjustment is necessary. This further improves preciseness of the spectral adjustment and makes it possible to generate light whose degree of spectral coincidence is higher.

(Method for Holding Optical Filter)

Figure 14:
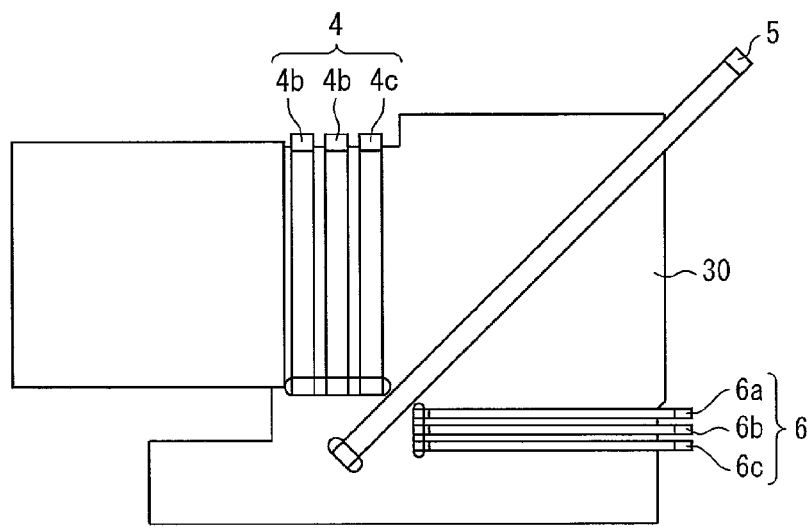
FIG. 14 is a view illustrating a holder holding optical filters according one embodiment of the present invention.

For further improvement of preciseness of spectral adjustment, as illustrated in FIG. 14, all of the optical filters 4 and 6 and the wavelength selecting means 5 may be stored together in a detachable holder 30 (holding means). In FIG. 14, each of the optical filters 4 and 6 is made of three sheets of filters, and optical filters 4a to 4c and 6a to 6c and the wavelength selecting means 5 are stored in the holder 30.

For example, in a case where a spectrum is to be changed by switching the optical filter 6a to the optical filter 16a (not illustrated), the holder 30 is once detached. Then, after the optical filter 6a on a xenon light source 11 side is switched to the optical filter 16a, the holder 30 is put back in place. In this way, once a position of the holder 30 is determined to a certain position in a simulated sunlight irradiation apparatus, optical filters can be switched very simply in a short period of time. Therefore, spectral adjustment of the simulated sunlight irradiation apparatus can be easily performed.

Note that optical filters 4 and 6 of First Embodiment may be stored in the holder 30 as illustrated in FIG. 14. In such a case, when a spectrum is to be changed, the holder 30 is once detached. Then, after one of the optical filters 4 and 6 is switched to another optical filter (optical filter 14 or 16), the holder 30 should be put back in place. Conversely, the optical filters 4a to 4c and 6a to 6c may be switched to the optical filters 14a to 14c and 16a to 16c, by use of filter sliders 26 and 28 and guiding sections 27 and 29 as in First Embodiment.

Third Embodiment

The following discusses still another embodiment of the present invention with reference to a drawing. Third Embodiment provides an arrangement for broadening an irradiation area. FIG. 15 is a view illustrating a substantial arrangement of a simulated sunlight irradiation apparatus 110 according to Third Embodiment.

As illustrated in FIG. 15, in the simulated sunlight irradiation apparatus 110, a light guide plate 8 in a simulated sunlight irradiation apparatus 100 is divided into a plurality of light guide members 60a to 60h (8 light guide members in FIG. 9). Further, for each of the light guide members 60a to 60h, a set of a plurality (four in a set in FIG. 10) of light introducing sections 61a to 64a, . . . or 61h to 64h are provided. The plurality of light introducing sections 61a to 64a, . . . or 61h to 64h correspond to light introducing sections 20a and 20b in the simulated sunlight irradiation apparatus 100.

In the simulated sunlight irradiation apparatus 110, by dividing the light guide plate 8 into the plurality of light guide members 60a to 60h, a total input light intensity can be increased. Further, in the simulated sunlight irradiation apparatus 110, by providing the plurality of light introducing sections 61a to 64a for one light guide member 60a, increase in light intensity can be ensured. In the above arrangement, it is possible to irradiate a large area with simulated sunlight having a high degree of spectral coincidence form each of the light guide members 60a to 60h.

The present invention is not limited to the description of the embodiments above, but may be altered by a skilled person within the scope of the claims. An embodiment based on a proper combination of technical means modified as appropriate within the scope of the claims is encompassed in the technical scope of the present invention.

Overview of Embodiments

The simulated sunlight irradiation apparatus according to one embodiment of the present invention is arranged such that: the at least one first optical filter is plurally provided; the at least one second optical filter is plurally provided; and at least one of thus plurally provided first optical filters and thus plurally provided second optical filters is provided so as to be switchable to another optical filter having a transmittance characteristic that is different from the transmittance characteristic of the at least one of the plurally provided first optical filters and the plurally provided second optical filters.

According to the above arrangement, the first optical filter is plurally provided and the second optical filter is plurally provided. Further, a wavelength band of a transmittance controlled by each of the first optical filter and the second optical filter is finely divided. This makes it possible to perform finer spectral adjustment of the wavelength band. More specifically, in accordance with a wavelength band for which spectral adjustment is desired, an optical filter for controlling the wavelength band is selected as appropriate from among a plurality of optical filters constituting the first optical filter or the second optical filter, and thus selected optical filter is switched as appropriate to the another optical filter. This makes it possible to generate simulated sunlight whose spectrum is closer to a desired sunlight spectrum.

Particularly in the above arrangement, either one of the first light and the second light undergoes spectral adjustment. Further, this spectral adjustment is carried out for only a wavelength band for which spectral adjustment is required. This improves precision of the spectral adjustment and makes it possible to generate light having a higher degree of spectral coincidence.

Further, the simulated sunlight irradiation apparatus according to one embodiment of the present invention is arranged such that: the light selecting section selects (i) light having a wavelength shorter than a predetermined wavelength from the first light whose transmittance is controlled by the at least one first optical filter and (ii) light having a wavelength longer than the predetermined wavelength from the second light whose transmittance is controlled by the at least one second optical filter; the at least one first optical filter controls a transmittance in a short wavelength band including wavelengths shorter than the predetermined wavelength; and at least one of the at least one first optical filter is provided so as to be switchable to another optical filter having a transmittance characteristic that is different from the transmittance characteristic of the at least one of the at least one first optical filter.

Sunlight spectra of respective regions are significantly different from one another particularly in spectrum having short wavelengths (equal to or shorter than 650 nm). Accordingly, in the above arrangement, a wavelength band that tends to vary for each region in the sunlight spectrum can be adjusted. Therefore, only by changing a first optical filter to another optical filter having a transmittance characteristic different from that of the first optical filter, it becomes possible to irradiate simulated sunlight having a desired sunlight spectrum and a high degree of spectral coincidence.

In addition, the simulated sunlight irradiation apparatus according to one embodiment of the present invention is arranged such that the at least one first optical filter, the at least one second optical filter and the light selecting section are held together in detachable holding means.

In the above arrangement, the first optical filter or the second optical filter can be very simply switched in a short period of time. Therefore, spectral adjustment in the simulated sunlight irradiation apparatus can be easily performed.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to tests, measurements, and experiments of solar cells. The present invention is also applicable to color degradation and reaction-to-light tests of cosmetics, paints, adhesives, and other various materials. In addition, the present invention is applicable to tests and experiments of photocatalysts, and other various experiments/tests that require natural light.

REFERENCE SIGNS LIST

1 halogen light source
2, 12 light collecting element
3, 13 taper coupler
4, 4a to 4c, 6, 6a to 6c, 14, 14a to 14c, 16, 16a to 16c optical filter
5 wavelength selecting means
7a, 7b, 17a, 17b light shielding member
8 light guide plate
9 light extracting section
11 xenon light source
20 irradiation target object
20a, 20b light introducing section
26, 28 filter slider
27, 29 guiding section
30 holder
60a ... 60b light guide member
61a to 64a ... 61h to 64h light introducing section
100, 110 simulated sunlight irradiation apparatus

The invention claimed is:

1. A simulated sunlight irradiation apparatus comprising:
   a first light source emitting first light;
   a second light source emitting second light having a spectral distribution different from a spectral distribution of the first light;
   at least one first optical filter having a transmittance characteristic for controlling a transmittance of the first light;
   at least one second optical filter having a transmittance characteristic for controlling a transmittance of the second light;
   a light selecting section causing simulated light to be emitted, by mixing light selected from the first light and the second light having entered the light selecting section, the first light having a transmittance controlled by the at least one first optical filter, the second light having a transmittance controlled by the at least one second optical filter;
   a light guide plate which the simulated sunlight emitted from the light selecting section enters;
   a light extracting section causing the simulated sunlight having entered the light guide plate to be extracted through an irradiation surface of the light guide plate,
   at least one of the at least one first optical filter and the at least one second optical filter being provided so as to be switchable to another optical filter having a transmittance characteristic that is different from the transmittance characteristic of the at least one of the at least one first optical filter and the at least one second optical filter.

2. The simulated sunlight irradiation apparatus set forth in claim 1, wherein:
   the at least one first optical filter is plurally provided;
   the at least one second optical filter is plurally provided; and
   at least one of thus plurally provided first optical filters and thus plurally provided second optical filters is provided so as to be switchable to another optical filter having a transmittance characteristic that is different from the transmittance characteristic of the at least one of the plurally provided first optical filters and the plurally provided second optical filters.

3. The simulated sunlight irradiation apparatus as set forth in claim 1, wherein:
   the light selecting section selects (i) light having a wavelength shorter than a predetermined wavelength from the first light whose transmittance is controlled by the at least one first optical filter and (ii) light having a wavelength longer than the predetermined wavelength from the second light whose transmittance is controlled by the at least one second optical filter;
   the at least one first optical filter controls a transmittance in a short wavelength band including wavelengths shorter than the predetermined wavelength; and at least one of the at least one first optical filter is provided so as to be switchable to another optical filter having a transmittance characteristic that is different from the transmittance characteristic of the at least one of the at least one first optical filter.

4. The simulated sunlight irradiation apparatus as set forth in claim 1, wherein the at least one first optical filter, the at least one second optical filter and the light selecting section are held together in detachable holding means.

5. A spectrum adjustment method for the simulated sunlight irradiation apparatus as set forth in claim 1, comprising the step of adjusting a spectral distribution of the simulated sunlight by switching at least one of the at least one first optical filter and the at least one second optical filter to another optical filter having a transmittance characteristic that is different from the transmittance characteristic of the at least one of the at least one first optical filter and the at least one second optical filter.

* * * * *